United States Patent [19]

Nogita et al.

[11] 3,831,447
[45] Aug. 27, 1974

[54] METHOD OF MEASURING THE FLOW RATE IN A PLURAL-FLOW SYSTEM
[75] Inventors: Shunsuke Nogita; Yukio Kawamoto, both of Hitachi, Japan
[73] Assignee: Hitachi, Ltd., Tokyo, Japan
[22] Filed: Feb. 20, 1973
[21] Appl. No.: 334,096

[30] Foreign Application Priority Data
Feb. 21, 1972 Japan................................ 47-17214

[52] U.S. Cl............................. 73/195, 235/151.34
[51] Int. Cl............................................. G01f 1/00
[58] Field of Search...... 73/195, 194 E, 194 R, 196, 73/202; 235/151.2, 151.34

[56] References Cited
UNITED STATES PATENTS
2,314,152  3/1943  Mallory................................ 73/196
2,800,017  7/1957  Ruelland.............................. 73/195
3,711,689  1/1973  Park.................................. 73/196 X FOREIGN PATENTS OR APPLICATIONS
895,792  5/1962  Great Britain....................... 73/196

*Primary Examiner*—Richard C. Queisser
*Assistant Examiner*—Stephen A. Kreitman
*Attorney, Agent, or Firm*—Craig & Antonelli

[57] ABSTRACT

A plurality of measuring instruments are inserted in a flow system having a plurality of stable and continuous flow paths in such a manner as to constitute a plurality of material balance equation groups each including a multiplicity of measurement factors. In this way, whether the measurement of the flow rate in a flow path under consideration is accurate or not is determined statistically as it is related to the measurements of the flow rates in the remaining flow paths in respect of the material balance equation. Further, an estimated value which takes the place of an erroneous measurement is easily calculated.

11 Claims, 3 Drawing Figures

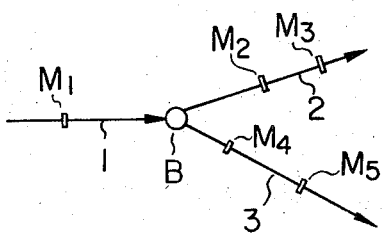
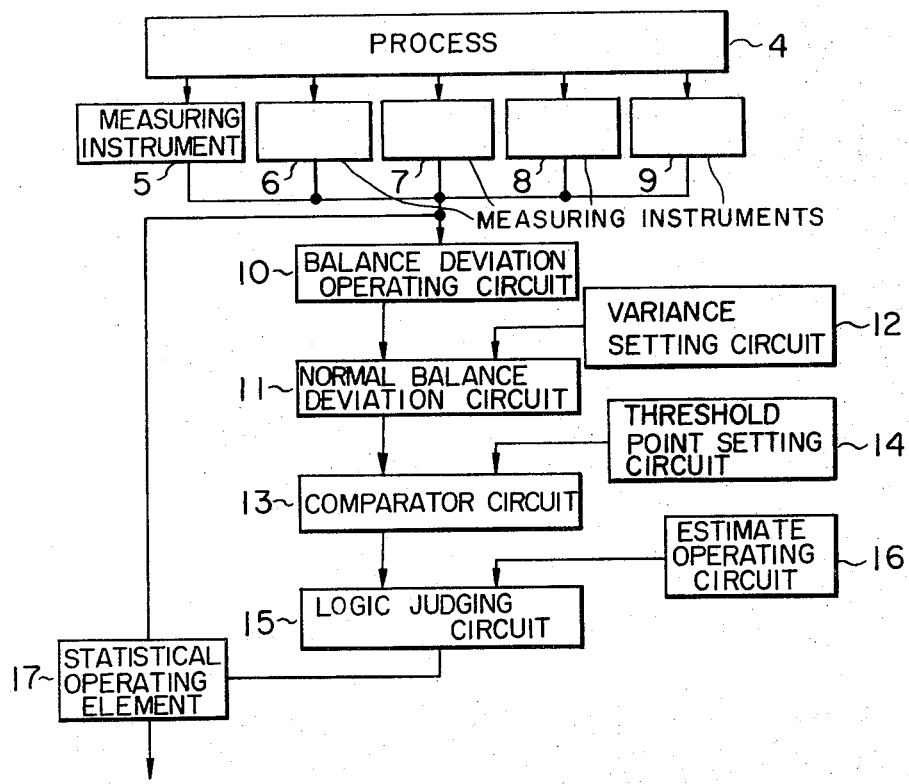
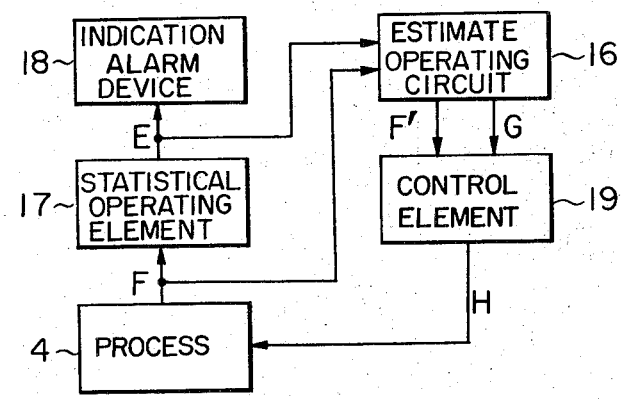

METHOD OF MEASURING THE FLOW RATE IN A PLURAL-FLOW SYSTEM

BACKGROUND OF THE INVENTION

1. Field of the Invention

This invention relates to a method of measuring the flow rate in a flow system with a plurality of stable and continuous flow paths including transportation and distribution lines for oil and natural gas, pipe lines built around a reactor or separator of a chemical plant, an electric current distribution system or the like (hereinafter generally referred to as "a flow system").

2. Description of the Prior Art

A stable and continuous operation for a long time is required for a flow system used in industry, and for this purpose it is of primary importance to take measures to improve the reliability of the component elements involved and to provide spare equipments.

One of the methods currently employed to improve the reliability is to provide a duplicate measuring system. In the case of a disagreement in the measurements for the two instruments included in such a system, however, the conventional methods provide no satisfactory means to determine which of the measurements is erroneous, so that the continuous operation of a flow system naturally results in instability and inaccuracy of the operation.

SUMMARY OF THE INVENTION

An object of the present invention is to provide a novel and effective method of measuring the flow rate in a flow system including a plurality of flow paths thereby to secure the fail-safe operation of the system.

Another object of the present invention is to provide a method of measuring the flow rate in which efficient maintenance work of a flow system is effected by picking up quickly and accurately a detected abnormal value.

According to the present invention, a plurality of measuring instruments are inserted in a flow system in such a manner as to constitute a plurality of material balance equation groups each including a multiplicity of measurement points, whereby the accuracy of a signal indicative of a measurement of the flow path under consideration as related to the signals indicative of the flow rate in the remaining flow paths is statistically determined by means of the material balance equations.

Further, according to the invention, any abnormal value which may be detected is inserted as an unknown quantity in all the material balance equations thereby to obtain an estimate thereof.

BRIEF DESCRIPTION OF THE DRAWING

FIG. 1 is a schematic diagram showing a flow system to which the present invention is applied.

FIG. 2 is a block diagram showing an embodiment of the invention.

FIG. 3 is a block diagram showing an application of the present invention to a process control.

DETAILED DESCRIPTION OF THE PREFERRED EMBODIMENTS

Prior to describing embodiments of the invention, the facts on which the application of the invention is based will be explained below. The method according to the invention is applied effectively only when the following four prerequisites are met:

1. The plant involving a flow system to which the invention is intended to be applied is in a steady state.
2. Leakage or local accumulation of the flowing material is negligibly small. 3. The variances of random errors are previously known.
4. Every random error is statistically independent from every other.

In addition to the above-mentioned preconditions, the present invention is based on the assumption that the greater part of a set of measurements is correct. This is required to secure the reasonableness of "the rule of majority" which plays an important role in the application of the present invention. This rule of majority is such that in the case where there is an evaluation which deviates greatly from a given criterion, it is assumed that the evaluation derives from the combination of a few erroneous measurements and a multiplicity of correct measurements.

The words "the actual measurements" and "ideal measurements" as they are used in this specification are defined as follows:

It is assumed that a set of measurements taken at a given time satisfy the material balance equation relatively well according to the prerequisites (1) and (2). The measurements which satisfy the material balance equation as above are called "the ideal measurements" hereafter and distinguished from "the actual measurements." In other words, it is considered that a set of ideal measurements corresponding to measurements taken at the same time satisfy the material balance equation.

A schematic diagram of a typical flow system to which the present invention is applied is shown in FIG. 1. For convenience of illustration, the flow system is shaped in the letter of Y with five measurement points established therein.

The symbol B in the drawing shows a dividing point where the fluid in the flow path 1 is divided into the flow paths 2 and 3. The measurements taken at the measurement points M1, M2, . . . M5 located in the flow paths 1, 2 and 3 are indicated as F1, F2, . . . F5 and the ideal measurements thereat as Y1, Y2, . . . Y5 respectively.

It is assumed that the variances of the random errors of the measurements F1, F2, . . . F5 are the same and take the value of $\Sigma^2$. For this Y-shaped flow system, there are six combinations of measurement points, as shown in Table 1 below, whereby the balance of material is taken effectively.

Table 1

| Balance Groups | Measurement Points | | |
| --- | --- | --- | --- |
| I | M1, | M3, | M5 |
| II | M1, | M2, | M4 |
| III | M1, | M3, | M4 |
| IV | M1, | M2, | M5 |
| V | M2, | M3 | |
| VI | M4, | M5 | |

As described above, the method of measuring the flow rate in a flow system according to the present invention is characterized in that a plurality of measuring instruments are arranged at a plurality of measurement points in the flow system in such a manner as to constitute a plurality of material balance groups each including a plurality of measurement points, whereby it is determined whether the measurements obtained from the measurement points M1, M2, . . . M5 are normal or not thereby to improve the overall reliability of the flow system.

To facilitate the understanding of the method according to the invention, a circuit arrangement and the operation thereof will be explained with reference to an embodiment of the invention.

In FIG. 2, the process 4 is indicative of the Y-shaped flow system shown in FIG. 1, and the measurements F1, F2, . . . F5 obtained by measuring instruments 5, 6, . . . 9 arranged in the flow system are applied to a balancing deviation operating circuit 10. A circuit 10 is such that the balance deviations of the balance groups I, II, . . . VI which depend upon the type of the processes shown in Table 1 and the arrangement of the measuring instruments are obtained from the equation (1) below.

$$\left.\begin{array}{l} ZI = F1 - F3 - F5 \\ ZII = F1 = F2 - F4 \\ ZIII = F1 - F3 - F4 \\ ZIV = F1 - F2 - F5 \\ ZV = F2 - F3 \\ ZVI = F4 - F5 \end{array}\right\} \quad (1)$$

By way of reference, the relationship between the ideal measurements Y1, Y2, . . . Y5 for the material balance groups I, II, . . . VI respectively shown in Table 1 is as follows:

$$\left.\begin{array}{l} Y1 - Y3 - Y5 = 0 \\ Y1 - Y2 - Y4 = 0 \\ Y1 - Y3 - Y4 = 0 \\ Y1 - Y2 - Y5 = 0 \\ Y2 - Y3 = 0 \\ Y4 - Y5 = 0 \end{array}\right\} \quad (2)$$

Assuming that the measurements $FI$ ($I = 1, 2, \ldots 5$) are in a normal distribution around the ideal measurement $YI$ with a variance $\Sigma^2$, the expected value of the balance deviation shown by the equation (1) is zero as is apparent from the equation (3).

$$\left.\begin{array}{l} E(ZI) = 0, E(ZII) = 0, E(ZIII) = 0 \\ E(ZIV) = 0, E(ZV) = 0, E(ZVI) = 0 \end{array}\right\} \quad (3)$$

where the symbol $E$ is representative of the expected value. This conclusion is reached as is explained below.

The measurement FI is expressed as $$FI = YI + KI \quad (4)$$

where $KI$ is a random error of the measurement $FI$. When the right side of the equation (4) is substituted for the equation (1) while taking into account the relation of equation (2), the equation (5) below is obtained as an example.

$$\begin{array}{l} ZI = YI - Y3 - Y5 + K1 - K3 - K5 \\ = K1 - K3 - K5 \end{array} \quad (5)$$

In this equation (5), the expected value of each element is zero and therefore the expected value of the balance deviation $ZI$ is also zero. In like manner, it is noted that the expected values of the deviation $ZII$, $ZIII$, . . . $ZVI$ are zero.

According to a formula of the statistics, the variance of material balance deviation as defined in equation (1) is characterized by the relationship as indicated in the equation (6).

$$(\Sigma I)^2 = (\Sigma II)^2 = (\Sigma III)^2 = (\Sigma IV)^2 = 3\Sigma^2$$

$$(\Sigma V)^2 = (\Sigma VI)^2 = 2\Sigma^2 \quad (6)$$

Turning back now to the embodiments of the invention, the normal balance deviation circuit 11 functions in such a manner as to produce a normalized deviation $NI$ representing the normality of the balance as shown in equation (7), by reference to not only the balance deviations supplied from the circuit 10 but the variance of each balance deviation obtained from the variance setting circuit 12.

$$NI = ZI/\Sigma I \quad (7)$$

where $I = I, II, \ldots VI$.

In view of the fact that the normalized balance deviation $NI$ obtained from the circuit 11 has the normal distribution of mean value 0 and variance 1, it is necessary as a next step to determine whether or not the deviation $NI$ obtained from the measurement data should be considered justifiably as a specimen resulting from a normal population of mean value 0 and variance 1.

A comparator circuit 13 functions in such a manner as to compare the absolute values of the normalized deviations $NI$ ($I = I, II, \ldots VI$) obtained from the circuit 11 with thresholds R determined by a threshold setting circuit 14 thereby to decide whether or not each normalized deviation has a significant difference. For example, if it is determined that a normalized deviation of $|NI| \geq 1.645$ has a significant difference exceeding the threshold it is known by reference to an accumulative normal distribution table that the normalized deviation $NI$ has the systematic error with 10 percent of the level of significance, that is, the probability of making an error of the first kind.

In other words, it is inferred according to the rule of majority that a systematic error exists in the measurement data on the balance group I with the 10 percent probability. In this way, the circuit 13 determines for each of the normalized deviations $NI$, $NII$, . . . $NVI$ whether it has a systematic error or not. That is to say, the two-way decision is made as to whether there is a systematic error or not for each of the balance groups $I, II, \ldots VI$.

A signal from the circuit 13 relating to the presence or absence of a significant difference in the normalized deviations $NI$, $NII$, . . . $NVI$ is applied to a logic judging circuit 15, which picks out a suspected measurement value FI from among the seven cases shown in Table 2. This is based on the experimental fact that in spite of $2^6 = 64$ combinations being available from the judgement as to the presence or absence of a systematic error in the balance groups I, II, . . . VI, the detection of a systematic error at a specified measurement point most likely results in the occurrence of the combination of the seven cases described in Table 2 below. (The symbol $x$ in the table indicates that there is a systematic error.)

Table 2

| Balance Deviation | Cases | | | | | | |
|---|---|---|---|---|---|---|---|
| | 1 | 2 | 3 | 4 | 5 | 6 | 7 |
| NI | x | | x | | x | | |
| NII | x | x | | x | | | |
| NIII | x | | x | x | | | |
| NIV | x | | | | x | | |
| NV | | x | x | | | x | |
| NVI | | x | | x | x | | x |
| Erroneous Measurements | F1 | F2 | F3 | F4 | F5 | F2 F3 | F4 F5 |

Explanation will be made now of the manner in which Table 2 is obtained. Assuming that there is a systematic error J1 in the measurement F1 obtained from the measurement point M1, the measurement F1 is expressed as $$F1 = Y1 + K1 + J1$$
$$FI = YI + KI \quad (8)$$

where $I = 2, 3, \ldots 5$.

When these values are substituted for the equation (1) and the expected values of the normalized deviations $NI, NII, \ldots NVI$ from the equation (7), the results is the equation (9).

$$E(NI) = E(NII) = E(NIII)$$
$$= E(NIV) = J1/\sqrt{3}\Sigma \quad (9)$$
$$E(NV) = E(NVI) = 0$$

Similar procedures are followed as to the systematic errors $J2, J3, \ldots J5$ which may be derived from the measuring points M2 to M5 thereby to obtain Table 3 below.

Table 3

| Balance Deviation | Systematic error | | | | |
|---|---|---|---|---|---|
| | J1 | J2 | J3 | J4 | J5 |
| NI | J1/A | 0 | J3/A | 0 | J5/A |
| NII | J1/A | J2/A | 0 | J4/A | 0 |
| NIII | J1/A | 0 | J3/A | J4/A | 0 |
| NIV | J1/A | 0 | 0 | 0 | J5/A |
| NV | 0 | J2/B | J3/B | 0 | 0 |
| NVI | 0 | J2/B | 0 | J4/B | J5/B |

In this table, $A = \sqrt{3}\Sigma$ and $B = \sqrt{2}\Sigma$. It will be seen from this table that the systematic error J1 is considered to be present if $|NI| \geq 1.645$, $|NII| \geq 1.645$, $|NIII| \geq 1.645$, $|NIV| \geq 1.645$, $|NV| \geq 1.645$ and $|NVI| \leq 1.645$. Similar procedures are followed to obtain Table 2.

In the case of occurrence of cases other than those included in Table 2, the measurement operation is continued and the resulting two or more sets of measurement data taken at the same time are used thereby to improve the detection sensitivity and to enable the judgement of Table 2.

When a suspicious measurement F1 is obtained from the circuit 15, an estimate operating circuit 16 is referred to thereby to seek an estimated value of the measurement F1. In order to reach the estimated value of the flow rate according to the measurement, the circuit 16 functions in such a manner that as in the circuit 10 the balance deviation equations of FIG. 1 are introduced from the predetermined balance groups and measurements, and in the case of occurrence of a suspicious measurement being supplied from the circuit 15 zero is substituted for the left side of the equation (1) relating to the measurement under consideration.

In this connection, it rarely happens that two measurements have systematic errors at the same time in an industrial flow system which is well managed and maintained. As a result, a flow system to which the present invention is applicable such as is shown in FIG. 1 is capable of being operated on the basis of the judgements shown in FIG. 2. Incidentally, conditions of judgement of complicated cases involving different variances of random errors of measurements are readily obtained in a manner similar to that shown with reference to Table 2.

Further, it will be easily understood that the present invention is applicable not only to the total flow rate of the system but to a component of the flow rate if the balance equations relating thereto are known.

The circuit arrangement of a flow rate control circuit according to the method of the invention is shown in FIG. 3, in which like numerals denote like elements as in the circuit of FIG. 2.

A measurement signal F from the process 4 is applied to a statistical operating element 17 comprising the already mentioned circuits 10, ... 16, which element 17 picks out by a well-known method any erroneous measurement that may be included. A signal E representing such an erroneous measurement is applied to an indication alarm device 18 thereby to drive the same.

The output E of the element 17 is applied to the circuit 16 whereby an estimate of the measurement corresponding to the signal E is figured out. A signal G representing the estimate and a signal F' representing other measurements than the erroneous measurement are applied to a control element 19, the relation $F = F'$ being maintained in the circuit 16 in the absence of an erroneous measurement signal. The control element 19 then applies a predetermined control signal H to the process 4 to effect the normal operation of the process in response to a reasonable measurement of the flow rate supplied to the control element 19.

It will be understood from the above description that according to the present invention a plurality of measurement points are arranged in a flow system in such a manner as to constitute a plurality of material balance groups each including said plurality of measurement points whereby the reasonableness of a measurement of the flow rate in a flow path under consideration is determined statistically taking into account the measurements of the flow rate in the other flow paths. In this way, an optimum estimate is obtained which takes the place of the erroneous measurement. The method of the present invention thus always provides the most appropriate measurements, making possible stable and continuous operation of the flow system under control of the obtained measurements. Further, the fact that the measurements are detected quickly permit an abnormality to be repaired immediately.

I claim:

1. A method of measuring a flow rate of a flow system having a plurality of stable and continuous flow paths comprising the steps of measuring the value of the flow rate at each of a plurality of separated points along the system, combining the measured values at a plurality of the separated points in accordance with a plurality of material balance groups representative of each of the plural flow paths such that each material balance group includes at least one measured value common to another material balance group, and determining the accuracy of the measurement of the flow rate for a predetermined flow path by comparing the resultant combination of the measured values representative of the predetermined flow path with the resultant combination of the measured values representative of the other flow paths in material balance.

2. A method according to claim 1, wherein the flow system includes at least one junction and the step of measuring includes measuring values at at least two separated points in at least one flow path on one side of the junction.

3. A method according to claim 2, wherein the step of measuring includes measuring values at at least two separated points in two flow paths on one side of the junction.

4. A method according to claim 1, wherein the step of determining the accuracy of the flow rate for a predetermined flow path includes comparing the resultant combination of values representative of a flow path with a predetermined balance deviation value as an indication of improper flow rate measurement for the corresponding flow path.

5. A method according to claim 4, wherein the exceeding of the predetermined balance deviation value by the resultant combination of values in an indication of an improper flow rate measurement for the corresponding flow path and further comprising the step of selecting an abnormal measured value as the common measured value in each resultant combination of values representative of a material balance group which resultant combination of values exceed the balance deviation value.

6. A method according to claim 5, wherein each material balance group is represented by an equation in which the combination of measured values have a predetermined resultant value and further comprising the step of estimating a proper value for the abnormal measured value by representing the abnormal measured value as an unknown quantity in each of the equations having the abnormal measured value as a common value therein, and calculating the unknown quantity by solving the plural equations having the unknown quantity as a common value, the calculated unknown quantity being the estimated value.

7. A method according to claim 6, further comprising the step of utilizing the measured values and the estimated values to control the flow system.

8. A method according to claim 1, wherein the step of measuring includes generating electrical signals indicative of the measured values and the step of combining includes combining the electrical signals to form a resultant electrical signal, and the step of determining includes comparing the resultant electrical signals.

9. Apparatus for measuring the flow rate of a flow system having a junction and a plurality of stable and continuous flow paths extending from the junction comprising a plurality of measuring means disposed at spaced points along the flow system so as to provide a plurality of measured value signals indicative of the flow rate for each of the flow paths, means for providing a plurality of material balance equations representative of a combination of a plurality of measured values for each flow path, and means for determining the accuracy of each resultant combination of signals for each balance equation by comparing the resultant combination of signals with a predetermined balance deviation signal value for each balance equation.

10. Apparatus according to claim 9, wherein said means for determining includes means for selecting a common measured signal value in a plurality of equations which exceed the balance deviation value as an abnormal value.

11. Apparatus according to claim 10, further comprising means for representing the abnormal detected value as an unknown quantity and calculating an estimated value for the unknown quantity by solving the plurality of balance equations having the unknown quantity therein.

* * * * *